United States Patent
Huang (10) Patent No.: US 8,209,444 B2
(45) Date of Patent: Jun. 26, 2012

(54) KEYBOARDS PROVIDING MACRO FUNCTIONS AND MACRO FUNCTION SETTING METHOD USING THE SAME, AND COMPUTER PROGRAM PRODUCTS THEREOF

(75) Inventor: Haw-Kae Huang, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 73 days.

(21) Appl. No.: 12/938,955

(22) Filed: Nov. 3, 2010

(65) Prior Publication Data

US 2012/0023268 A1   Jan. 26, 2012

(51) Int. Cl.
- *G06F 3/00* (2006.01)
- *G06F 3/02* (2006.01)
- *G09G 5/00* (2006.01)
- *G06F 5/00* (2006.01)

(52) U.S. Cl. .......... 710/18; 345/156; 345/168; 345/172; 715/704

(58) Field of Classification Search .............. 710/18
See application file for complete search history.

(56) References Cited

U.S. PATENT DOCUMENTS

| | | | | |
|---|---|---|---|---|
| 4,970,466 A * | 11/1990 | Bolles et al. | | 324/533 |
| 5,574,447 A * | 11/1996 | Roylance | | 341/22 |
| 6,640,144 B1 * | 10/2003 | Huang et al. | | 700/65 |
| 6,650,254 B1 * | 11/2003 | Rix | | 341/22 |
| 6,697,754 B1 * | 2/2004 | Alexander | | 702/119 |
| 7,196,691 B1 * | 3/2007 | Zweig | | 345/168 |
| 2006/0284846 A1 * | 12/2006 | Pate et al. | | 345/168 |
| 2006/0284847 A1 * | 12/2006 | Pate et al. | | 345/168 |

* cited by examiner

*Primary Examiner* — Henry Tsai
*Assistant Examiner* — Eric Oberly
(74) *Attorney, Agent, or Firm* — Chun-Ming Shih (57) ABSTRACT

Macro function setting methods for a keyboard with macro functions are provided. The keyboard includes a switch key and a set of macro keys, each macro key separately corresponding to a macro definition data in a plurality of predefined macro definition data. It is first detected that the switch key and a first macro key of the macro keys have been pressed, wherein the first macro key corresponds to a first macro definition data and corresponds to a macro index data. The number of times that the first macro key has been pressed is then calculated when the switch key has not been released. When the switch key is released, the macro index data of the first macro key is changed according to the calculated number of times such that the first macro key corresponds to a second macro definition data other than the first macro definition data.

17 Claims, 5 Drawing Sheets

FIG. 1

| | | |
|---|---|---|
| Segment 127 : 0x007F000H~0x07FFFFH | 122<sup>th</sup> macro definition data | 220_122 |
| ... | ... | |
| Segment 8 : 0x008000H~0x008FFFH | 4<sup>th</sup> macro definition data | 220_4 |
| Segment 7 : 0x007000H~0x007FFFH | Third macro definition data | 220_3 |
| Segment 6 : 0x006000H~0x006FFFH | Second macro definition data | 220_2 |
| Segment 5 : 0x005000H~0x005FFFH | First macro definition data | 220_1 |
| Segment 4 : 0x004000H~0x004FFFH | 0x009000H | 215 |
| Segment 3 : 0x003000H~0x003FFFH | 0x008000H | 214 |
| Segment 2 : 0x002000H~0x002FFFH | 0x007000H | 213 |
| Segment 1 : 0x001000H~0x001FFFH | 0x006000H | 212 |
| Segment 0 : 0x000000H~0x000FFFH | 0x005000H | 211 |

| | 140 |
|---|---|
| 220_122 — | Segment 127 : 0x007F000H~0x07FFFFH | 122ᵗʰ macro definition data |
| ... | ... | ... |
| 220_4 — | Segment 8 : 0x008000H~0x008FFFH | 4ᵗʰ macro definition data |
| 220_3 — | Segment 7 : 0x007000H~0x007FFFH | Third macro definition data |
| 220_2 — | Segment 6 : 0x006000H~0x006FFFH | Second macro definition data |
| 220_1 — | Segment 5 : 0x005000H~0x005FFFH | First macro definition data |
| 215 — | Segment 4 : 0x004000H~0x004FFFH | 0x009000H |
| 214 — | Segment 3 : 0x003000H~0x003FFFH | 0x008000H |
| 213 — | Segment 2 : 0x002000H~0x002FFFH | 0x007000H |
| 212 — | Segment 1 : 0x001000H~0x001FFFH | 0x006000H |
| 211 — | Segment 0 : 0x000000H~0x000FFFH | 0x006000H |

KEYBOARDS PROVIDING MACRO FUNCTIONS AND MACRO FUNCTION SETTING METHOD USING THE SAME, AND COMPUTER PROGRAM PRODUCTS THEREOF

BACKGROUND OF THE INVENTION

1. Field of the Invention

The disclosure relates generally to keyboards with macro functions and related macro function setting methods, and, more particularly to macro function setting methods capable of quickly changing a macro function of a single macro key without activation of software.

2. Description of the Related Art

Due to user requirements during special situations such as when playing games or editing documents, in addition to standard keys, current keyboards also provide macro keys which provide specific macro functions.

A macro represents a sequence of batch commands, such as a sequence of keyboard or mouse operations, that simplifies input operations that users need to perform. A user may record a sequence of key operations as a macro by software in advance and configure the macro to a macro key. Then, to perform the macro, the macro key corresponding to the macro may be pressed, such that the computer system performs the recorded macro content.

However, in currently sold products which provide macro functions, one macro key may only store one macro setting. If the macro function defined by an original macro key is to be changed, additional software may be needed and operated to change the macro function, and thus can not quickly change macro functions of macro keys without software activation.

Furthermore, some products with macro functions may provide a number of mode switches to change macros of groups of macro keys. When one of the modes has been selected, however, macro settings of an entire group of macro keys will all be changed. The macro settings of the group of macro keys will be varied fixedly even if a different mode has been selected. Again, it also can not quickly change macro functions of macro keys without software activation. Moreover, as the amount of the macro keys and provided modes are fixed (e.g. 30 macro settings may be used for a keyboard having 10 macro keys and 3 modes), the amount of macro keys available for use is limited and may not be efficiently increased.

BRIEF SUMMARY OF THE INVENTION

Keyboards with macro functions and related macro function setting methods are provided to quickly change macro functions of macro keys without software activation.

In an embodiment, a macro function setting method for a keyboard with macro functions is provided. The keyboard at least comprises a switch key and a set of macro keys and each of the macro keys separately corresponds to a macro definition data in a plurality of predefined macro definition data. The method comprises the following steps. First, it is detected that the switch key and a first macro key of the macro keys have been pressed, wherein the first macro key corresponds to a first macro definition data and corresponds to a macro index data. Then, the number of times that the first macro key has been pressed is calculated when the switch key has not been released. Thereafter, when the switch key is released, the macro index data of the first macro key is changed according to the number of times that the first macro key has been pressed such that the first macro key corresponds to a second macro definition data. The second macro definition data is one of the set of the definition data other than the first macro definition and the corresponding macro definition data of the remaining part of the set of the definition data remain unchanged.

An embodiment of a keyboard with macro functions comprises a keyboard array, a memory unit and a first microprocessor. The keyboard array includes at least one switch key and a set of macro keys, wherein each of the macro keys separately corresponds to a macro definition data in a plurality of predefined macro definition data and wherein a first macro key corresponds to a first macro definition data of the predefined macro definition data and corresponds to a macro index. The memory unit stores the macro definition data. The first microprocessor is coupled to the keyboard array and the memory unit, and when detecting that the switch key and the first macro key of the macro keys have been pressed and the switch key has not been released, the macro index of the first macro key changes each time the first macro key has been pressed and corresponds the first macro key to a second macro definition data, wherein the second macro definition data is one of the set of the definition data other than the first macro definition data and the corresponding macro definition data of the remaining part of the set of the definition data remain unchanged.

In another embodiment, a macro function setting method for a keyboard with macro functions is further provided, wherein the keyboard at least comprises a switch key and a set of macro keys and each of the macro keys separately corresponds to a macro definition data in a plurality of predefined macro definition data. It is first detected that the switch key and a first macro key of the macro keys have been pressed, wherein the first macro key corresponds to a first macro definition data. Next, an input code corresponding to a numeral key input detected by a microprocessor is obtained through a bus interface when detecting that the switch key has been pressed and the first macro key has not been released. Then, the macro definition data of the first macro key is changed according to the input code when detecting that the switch key and the first macro key have been released.

Macro function setting methods and keyboards with macro functions may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide a keyboard with macro functions and related macro function setting methods which use memory mapping to design a stack type database to locate the macro addresses such that when a physical key (macro key) has been pressed, the macro definition data corresponding to the pressed key will be re-addressed by accumulation method, thereby achieving a goal for changing the macro key. Therefore, the macro function of a single macro key can be quickly changed without software activation.

Figure 1:
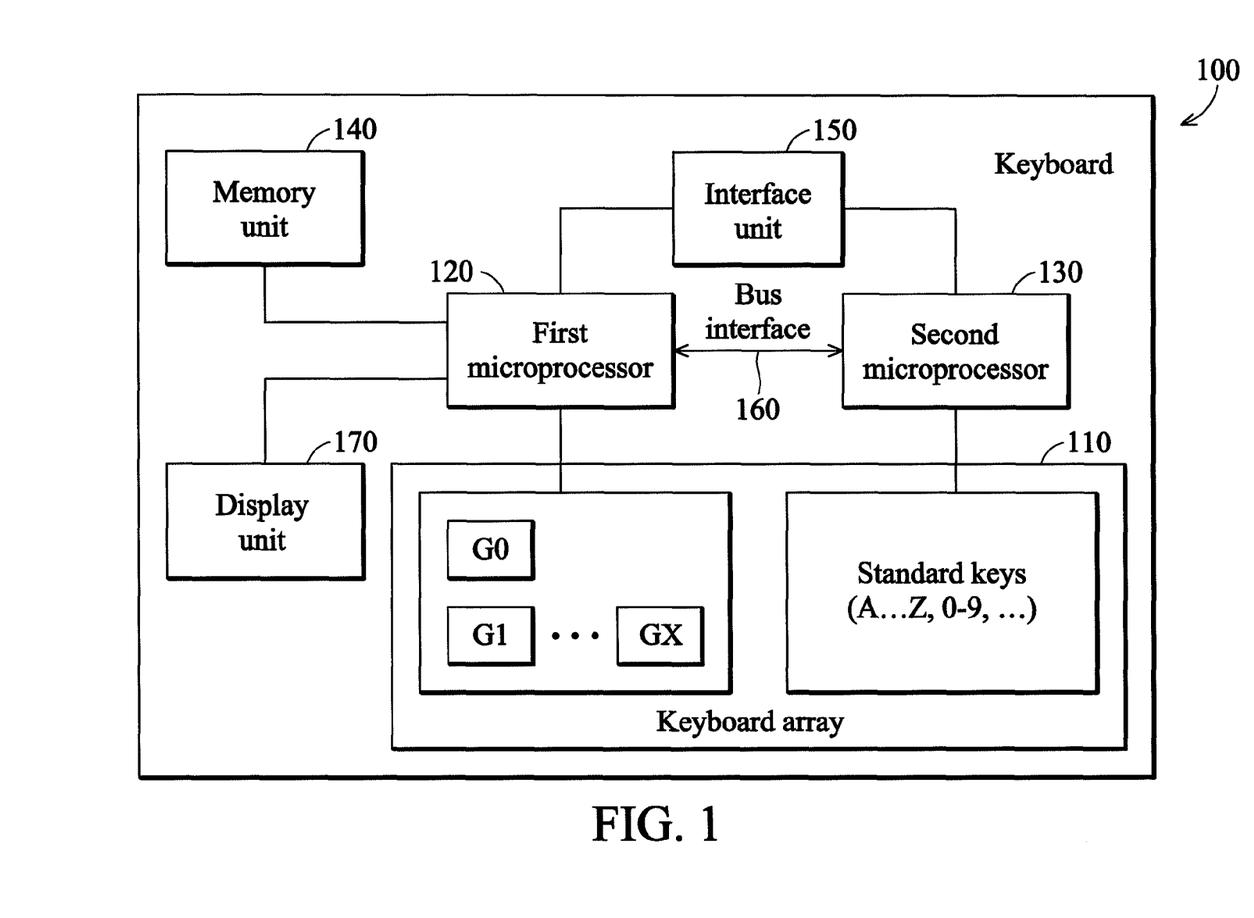
FIG. 1 is a schematic diagram illustrating an embodiment of a keyboard with macro functions.

FIG. 1 is a schematic diagram illustrating an embodiment of a keyboard 100 with macro functions. Note that here the keyboard with macro functions is referred to as keyboards that can provide physical keys (hereinafter referred to as macro keys) to perform specific macro settings. Macro setting represents a sequence of batch commands, such as a sequence of keyboard or mouse operations, for simplifying the input operation that users need to perform. For example, the keyboard 100 may be a game keyboard with macro keys and game players may speed up the progress of the game using the macro keys. The keyboard 100 at least comprises a keyboard array 110, a first microprocessor 120, a second microprocessor 130, a memory unit 140 and an interface unit 150. The keyboard array 100 includes multiple keys at least comprising a set of macro keys G1-GX, a switch key G0 and standard keys (typically including 102 keys, such as numeral keys 0-9, alphabet keys A-Z, function keys F1-F12, multimedia hot keys and so on). Each macro key may correspond to a macro definition data, wherein the macro definition data may be a sequence of key command data for a keyboard, multimedia keyboard and/or mouse, such as key values, actions (press or release) and delay times. In this embodiment, the macro definition data may be selected from a set of predefined macro data and is stored in a specific address in the memory unit 140.

When one of the macro keys has been pressed, the first microprocessor 120 may perform an operation indicated by the macro data corresponding to the pressed macro key. For example, if a macro key G1 corresponds to a first macro definition data, the first macro definition data will be performed when the macro key G1 has been pressed. Generally, the switch key and macro keys are physical keys other than the standard 102 keys. In one embodiment, the switch key and the macro keys may be indicated by a color different from that of the standard 102 keys and be located on a specific area on the keyboard for easy recognition and operation. In this embodiment, the first microprocessor 120 may receive input signals generated from the macro key and the switch key while the second microprocessor 130 may receive input signals generated from the standard 102 keys, but the invention is not limited thereto. The first microprocessor 120 may communicate with the second microprocessor 130 through a bus interface (e.g. a I2C bus). In one embodiment, under a specific condition such as a dedicated key has been pressed, the second microprocessor 130 may forward the input signals generated by the standard 102 keys to the first microprocessor 120 to be a code input signal as will be described later. The switch key G0 may be used to perform a re-setting operation for re-setting the macro functions which the macro keys correspond to. When the switch key G0 has been pressed, the corresponding macro function of a macro key will be redefined. In one embodiment, the first microprocessor 120 and second microprocessor 130 may be combined into a single microprocessor.

The memory unit 140 stores a set of predefined macro definition data and macro index for each macro key. For example, the memory unit 140 may be a flash memory, but the invention is not limited thereto.

Figure 2A:
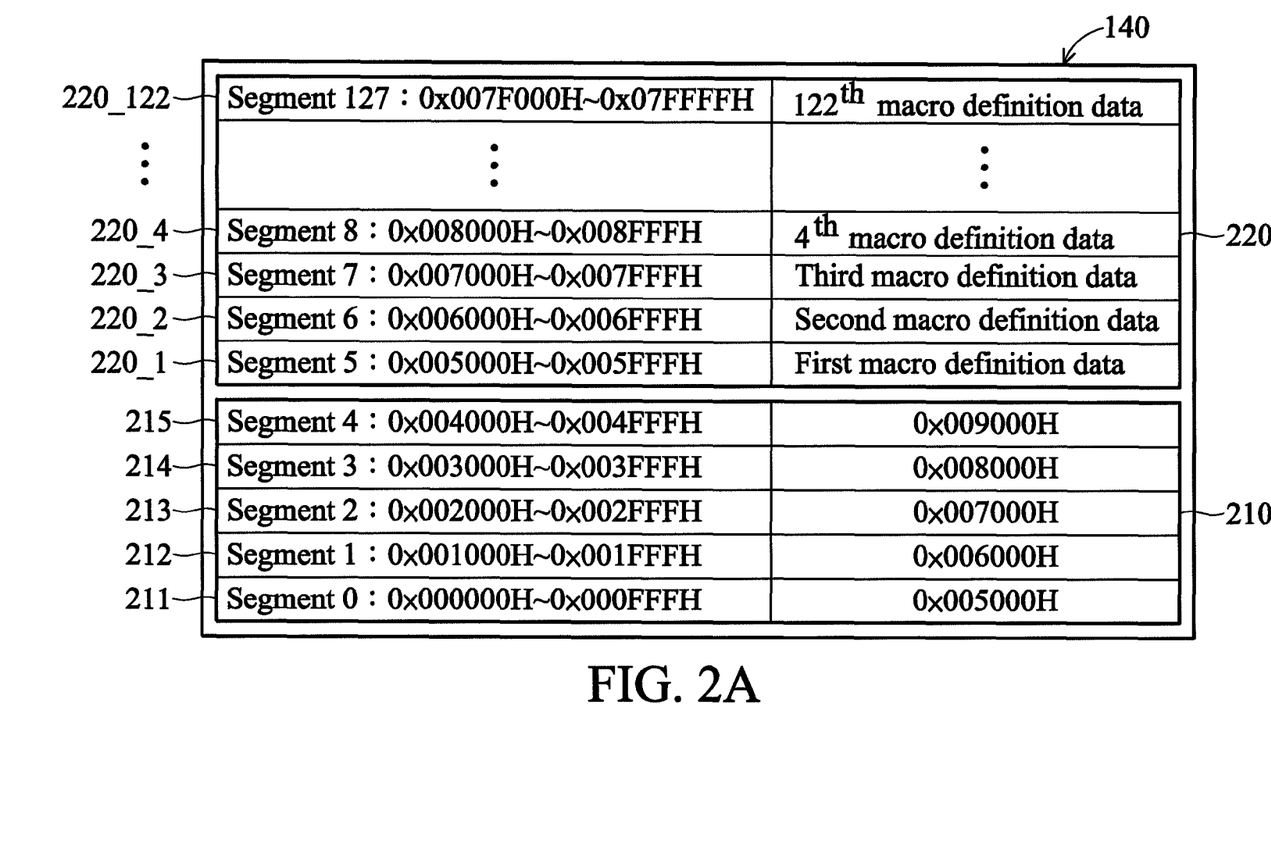
FIGS. 2A and 2B are schematic diagram illustrating embodiments of a memory location configuration of the invention.

The memory unit 140 may further include a first memory area and a second memory area, wherein the first memory area stores a corresponding index data for the corresponding macro data of each of the macro keys while the second memory area stores contents of the macro definition data. Each macro key may have a corresponding index address on a fixed location in the first memory area, wherein the index address points to a set of macro definition data in the second memory area. In this embodiment, memory mapping is applied to design a stack type database for addressing the macro keys. For example, please refer to FIG. 2A. FIG. 2A is a schematic diagram illustrating an embodiment of a memory location configuration of the invention. As shown in FIG. 2A, the memory unit 140 includes a first memory area 210 and a second memory area 220, wherein each of macro keys G1-G5 respectively correspond to a macro index in the first memory area 210. For example, the macro keys G1-G5 separately correspond to macro indexes 211-215 within segments 0-4 respectively, wherein the macro index corresponding to the macro key G1 is located in segment 0 (as shown in 211), the macro index corresponding to the macro key G2 is located in segment 1 (as shown in 212) and so on. The second memory area 220 includes predefined macro definition data 220_1-220_122, wherein each macro definition data represents a sequence of keyboard and/or mouse operations. In one embodiment, the predefined macro definition data may be provided based on user requirement or macro definition data that may be used can be recorded by using software or a user interface for advance editing by users. It is to be noted that the number of the macro definition data stored in the second memory area 220 may be adjusted according to the size of the memory unit 140, which is not limited by the number of the physical keys; thereby efficiently increasing the number of the macro definition data that can be used.

Next, the first microprocessor 120 may access the memory unit 140 and find the corresponding macro definition data of a specific macro key for execution. For example, as shown in FIG. 2A, when detecting that the macro key G1 has been pressed, because the macro index of the macro key G1 is located in the segment 0 of the first memory area 210, the first microprocessor 120 reads the value stored in the segment 0 and obtains that the macro index of the macro key G1 is the segment 5 within the second memory area 220. The first microprocessor 120 further performs actions indicated by the first macro definition data within the segment 5.

For example, when the macro key G1 has been pressed, because the macro index of the macro key G1 is located in the segment 0 of the memory unit 140, the data stored in the memory unit 140, i.e. the address 0x005000H stored in the segment 0, is first read and the macro data stored in the address 0x005000H, i.e. the segment 5, is obtained.

When the switch key has been pressed and has not been released, i.e. the switch mode is entered which means that the macro function setting is to be changed, the first microprocessor 120 may further detect which macro key has been pressed and change the setting of the pressed macro key. If the switch key G0 is not released by the user, the pressed macro key will be continually detected and the setting of the pressed macro key will be changed accordingly. Therefore, if the user presses and does not release the switch key G0 and presses the macro key G1 twice, the macro index of the macro key G1 will also be changed twice. In another embodiment, the number of the macro key G0 which has been pressed may be calculated while the macro index of the macro key G1 is unchanged. After the switch key G0 has been released, the macro index of the macro key G1 may be changed according to the calculated number.

Figure 2B:
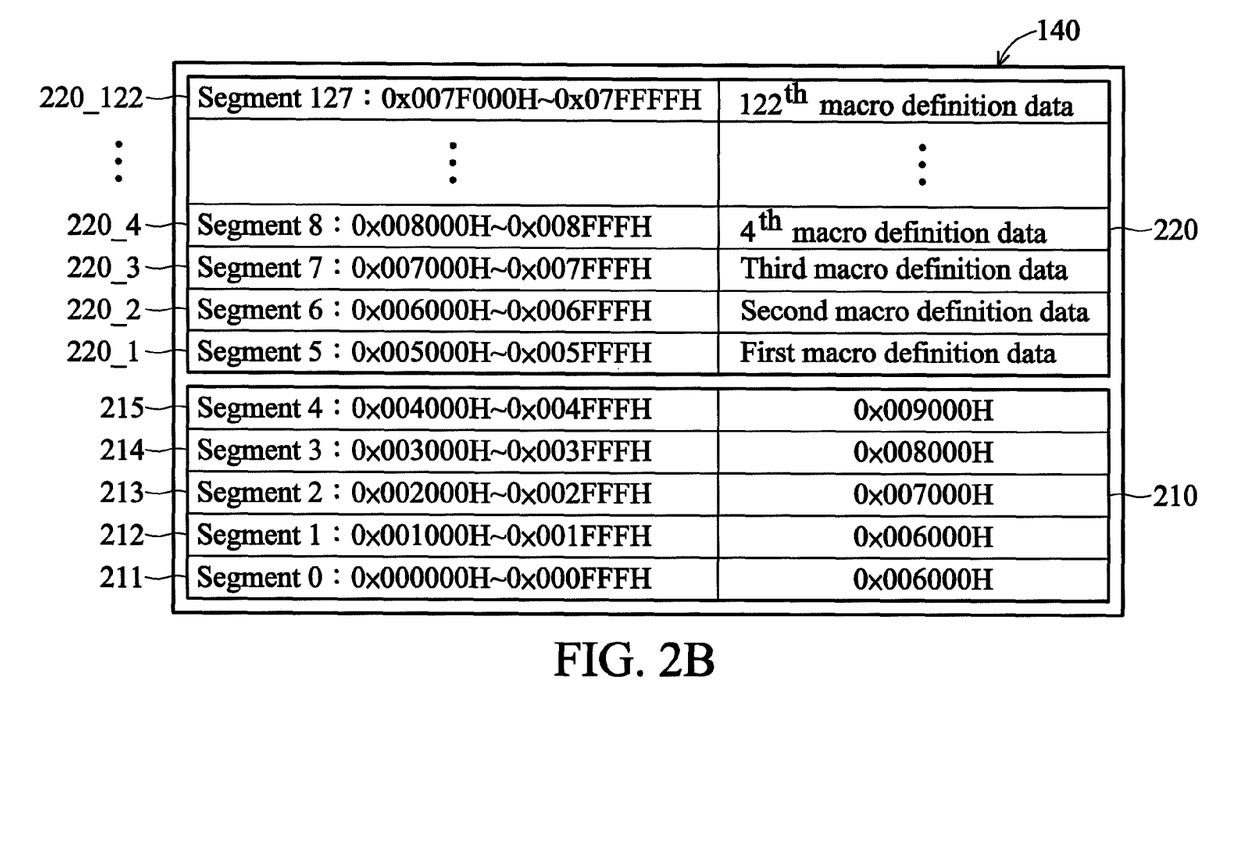

For example, if the key G1 has been pressed once, the first microprocessor 120 may automatically change the macro index data within the memory segment 0 from 0x005000H to 0x006000H, as shown in FIG. 2B.

Therefore, according to the method of the invention, functions of the macro keys can be changed directly without using any software.

In addition, the keyboard 100 may further comprise a display unit 170, which is coupled to the first microprocessor 120 for obtaining a switching result from the first microprocessor 120 and informing the switching result to the user. For example, the display unit 170 may be LED(s) or LCD(s) configured on the keyboard 100 for the user to easily confirm the switching result. Moreover, the keyboard 100 may further be coupled to an external data analysis device (not shown), such as a personal computer system, through the interface unit 150 (e.g. USB interface unit) for returning the switching result to the external data analysis device for confirming whether the switched macro index is correct. In one embodiment, the user may issue a command to the keyboard 100 through a user interface on the external data analysis device such that the keyboard 100, after receiving the command, may change the macro setting of the macro key based on the content of the received command.

The first microprocessor 120 may perform the macro function setting method of the invention. The macro function setting method of the invention will be detailed below.

Figure 3A:
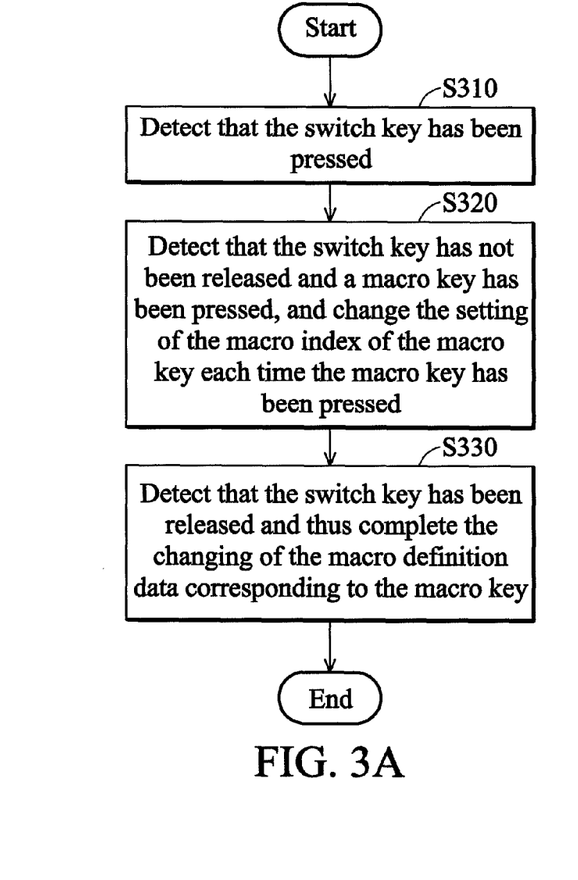
FIGS. 3A and 3B are flowcharts of embodiments of a macro function setting method of the invention.
Figure 3B:
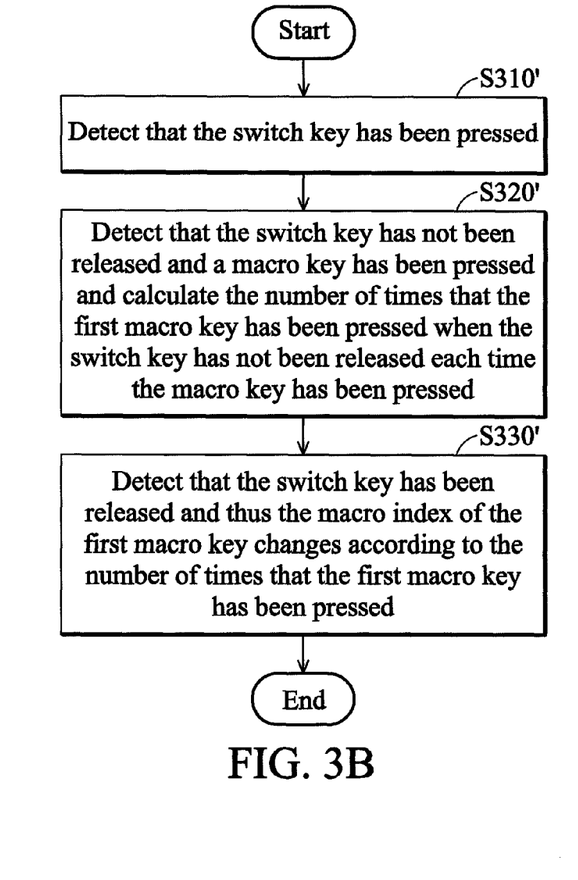

FIGS. 3A and 3B are flowcharts of embodiments of a macro function setting method of the invention. Please refer to FIG. 1, FIG. 2A and FIGS. 3A and 3B. First, referring to FIG. 3A, in step S310, the first microprocessor 120 detects that the switch key has been pressed, which means that the macro function setting is to be changed. Then, in step S320, the first microprocessor 120 detects that the switch key has not been released and a macro key (e.g. a first macro key G1) has been pressed, and changes the setting of the macro index of the macro key each time the macro key has been pressed. Next, in step S330, when the setting is completed, the first microprocessor 120 detects that the switch key has been released and thus completes the changing of the macro definition data corresponding to the macro key. Therefore, when the macro key has been pressed again, the first microprocessor 120 will perform the operation indicated by new macro definition data. Similarly, the keyboard 100 may comprise a display unit 170 (e.g. LED), which is coupled to the first microprocessor 120 for obtaining a switching result from the first microprocessor 120 and informing the switching result to the user.

It is to be noted that as only a single macro key has been pressed, only the macro setting of the pressed macro key will be changed while other macro definition data of the remaining part of the macro keys remain unchanged. In other words, only the setting of a single macro key will be switched.

In another embodiment, as shown in FIG. 3B. In step S310', the first microprocessor 120 detects that the switch key has been pressed, which means that the macro function setting is to be changed. Then, in step S320', the first microprocessor 120 detects that the switch key has not been released and a macro key (e.g. a first macro key G1) has been pressed and calculates the number of times that the first macro key has been pressed when the switch key has not been released each time the macro key has been pressed. Next, in step S330', when the setting is completed, the first microprocessor 120 detects that the switch key has been released and thus the macro index of the first macro key changes according to the number of times that the first macro key has been pressed.

If it is assumed that the macro index of original macro key is pointed to an address 0x005000H, the new address for the macro index of the macro key may be represented by the following formula:

$$\text{New address of the macro key} = 0x005000H + (0x001000H \times \text{the number of times that the macro key has been pressed}) \quad (1).$$

For example, the first microprocessor 120 may first obtain the macro index of the first macro key from the first memory area in the memory unit 140, then obtain a new macro index according to the calculated number of times that the first macro key has been pressed using the formula (1) and change the macro index of the first macro key within the first memory area to the new macro index. Therefore, the macro definition data corresponding to the first macro key will be changed from the first macro definition data originally corresponded to correspond to a new macro definition data that is pointed by the new macro index (e.g. the second macro definition data).

In another embodiment, when a dedicated key, e.g. the switch key, and one of the macro keys have been pressed, the second microprocessor 130 may forward the input signals generated by the standard 102 keys to the first microprocessor 120 to be a code input signal and then use the code input signal to perform the macro function setting. Please refer to FIG. 4.

Figure 4:
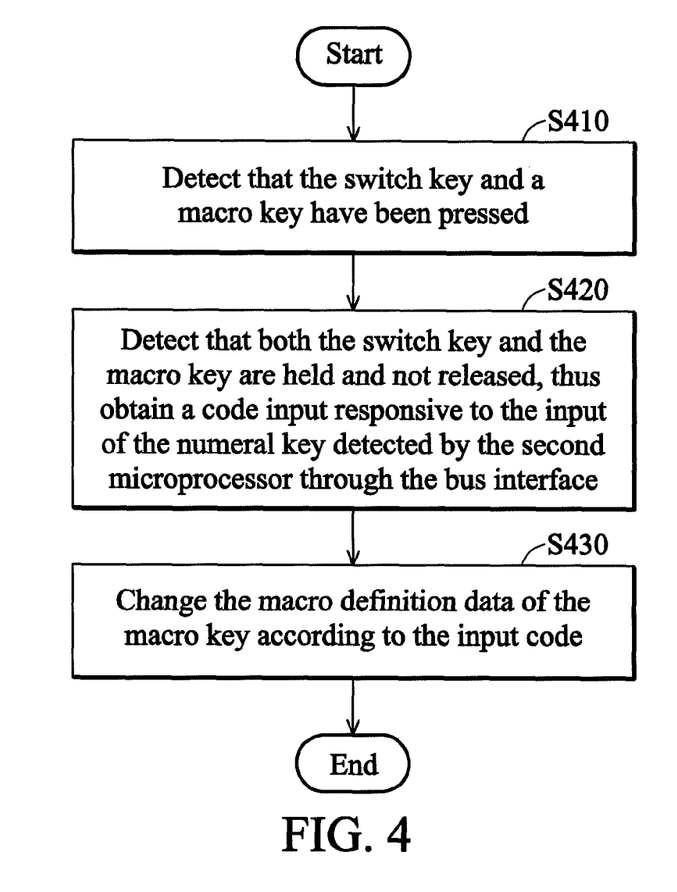
FIG. 4 is a flowchart of another embodiment of a macro function setting method of the invention.

FIG. 4 is a flowchart of another embodiment of a macro function setting method of the invention. Please refer together to FIG. 1, FIG. 2A and FIG. 4. The macro function setting method of the invention may be performed by the first microprocessor 120 shown in FIG. 1. In this embodiment, when both the switch key G0 and one macro key have been simultaneously pressed, the switching mode of the macro key will be entered and the macro index to be switched may be determined based on the input of the numeral keys.

First, in step S410, the first microprocessor 120 detects that the switch key (e.g. the switch key G0) and a macro key (e.g. the first macro key G1) have been pressed, which means that the macro function setting function is to be performed. Then, in step S420, the first microprocessor 120 detects that both the switch key and the macro key are held and not released, which means that the user will input code to perform the macro function setting, wherein the first microprocessor 120 obtains a code input responsive to the input of the numeral key detected by the second microprocessor 130 through the bus interface 160. The second microprocessor 130 may forward the input signals generated by the standard 102 keys to the first microprocessor 120 through the bus interface 160. Next, when the setting is completed, the first microprocessor 120 detects that the switch key and the macro key have been released and thus, in step S430, changes the macro definition data of the macro key according to the input code. For example, when obtaining a code input "3" that is generated by the input of the numeral key (i.e. the numeral key 3) detected by the second microprocessor 130, the first microprocessor 120 will change the macro definition data of the macro key to point to the third macro definition data. Therefore, when the macro key has been pressed again, the first microprocessor 120 will perform the operation indicated by the third macro definition data. Similarly, when the keyboard 100 comprises a display unit 170 (e.g. LED), the first microprocessor 120 may display the switching result using the display unit 170. In another embodiment, if the keyboard 100 is further coupled to a user interface, when detecting that both the switch key and the macro key are held and not released, the macro function setting method of the invention may further display a look-up table for the user to review and input code of desired macro function setting.

In another embodiment, the user may issue a command to the keyboard 100 through a user interface on the external data analysis device such that the keyboard 100, after receiving the command, may change the macro setting of the macro key based on the content of the received command.

In summary, according to the keyboard with macro functions and related macro function setting method of the invention, a goal for a single key changing the macro key function can be achieved and the macro definition data of a single macro key can be quickly and dynamically changed without software activation, making it easy for use by a user. Moreover, compared with conventional methods that provide only a fixed number of macro settings, the macro function setting method of the invention can provide numerous macro function options for macro keys; thereby making it easy to use of the macro keys.

Macro function setting methods and keyboards thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A macro function setting method for a keyboard with macro functions, wherein the keyboard at least comprises a switch key, a set of macro keys, and a memory unit, wherein the memory unit stores a set of predefined macro definition data and macro index and each of the macro keys separately corresponds to a macro definition data in a plurality of predefined macro definition data, and wherein the macro definition data represents a sequences of operations, the method comprising:
   detecting that the switch key and a first macro key of the macro keys have been pressed, wherein the first macro key corresponds to a first macro definition data and corresponds to a macro index;
   calculating the number of times that the first macro key has been pressed when the switch key has not been released; and
   when the switch key is released, changing the macro index of the first macro key according to the number of times that the first macro key has been pressed such that the first macro key corresponds to a second macro definition data.

2. The macro function setting method of claim 1, wherein the step of changing the macro index data of the first macro key according to the number of times that the first macro key has been pressed further comprises: obtaining a first macro index corresponding to the first macro key from a first location in the memory unit; obtaining a second macro index according to the first macro index and the number of times that the first macro key has been pressed; and storing the second macro index in the first location, wherein the second macro index points to the second macro definition data.

3. The macro function setting method of claim 2, wherein the memory unit further comprises a first memory area and a second memory area, and each of the macro keys has a fixed corresponding location within the first memory area while the predefined macro definition data is stored within the second memory area.

4. The macro function setting method of claim 1, further comprising:
   providing a display unit for displaying the setting result of the macro key.

5. The macro function setting method of claim 1, wherein the keyboard further couples to an external data analysis device and the keyboard further returns the switching results of the macro keys to the external analysis device.

6. The macro function setting method of claim 1, wherein the macro keys are controlled by a first microprocessor while the standard keys are controlled by a second microprocessor.

7. The macro function setting method of claim 6, wherein the first microprocessor is in communication with the second microprocessor through a bus interface.

8. A keyboard with macro functions, comprising:
   a keyboard array including at least one switch key and a set of macro keys, wherein each of the macro keys separately corresponds to a macro definition data in a plurality of predefined macro definition data, wherein the macro definition data represents a sequences of operations, and wherein a first macro key corresponds to a first macro definition data of the predefined macro definition data and corresponds to a macro index;
   a memory unit, storing the macro definition data and the macro index; and
   a first microprocessor coupled to the keyboard array and the memory unit, wherein when detecting that the switch key and the first macro key of the macro keys have been pressed and the switch key has not been released, the macro index of the first macro key changes each time the first macro key has been pressed and corresponds the first macro key to a second macro definition data, and the second macro definition data is one of the set of the definition data other than the first macro definition data, and the corresponding macro definition data of the remaining part of the set of the definition data remains unchanged.

9. The keyboard of claim 8, wherein the first microprocessor further obtains a first macro index corresponding to the first macro key from a first location in the memory unit, obtains a second macro index according to the first macro index and the number of times that the first macro key has been pressed, and stored the second macro index in the first location, wherein the second macro index points to the second macro definition data.

10. The keyboard of claim 9, wherein the memory unit further comprises a first memory area and a second memory area, and each of the macro keys has a fixed corresponding locations within the first memory area while the predefined macro defined data is stored within the second memory area.

11. A macro function setting method for a keyboard with macro functions, wherein the keyboard at least comprises a switch key, a set of macro keys, and a memory unit, wherein the memory unit stores a set of predefined macro definition data and macro index and each of the macro keys separately corresponds to a macro definition data in a plurality of predefined macro definition data, and wherein the macro definition data represents a sequences of operations, comprising: detecting that the switch key and a first macro key of the macro keys have been pressed, wherein the first macro key corresponds to a first macro definition data;

obtaining an input code corresponding to a numeral key input detected by a microprocessor through a bus interface when detecting that the switch key has been pressed and the first macro key has not been released; and changing the macro definition data of the first macro key according to the input code when detecting that the switch key and the first macro key have been released.

12. The macro function setting method of claim 11, further comprising:

the input code such that the macro definition data corresponding to the first macro key equals to macro definition data corresponding to a macro key of the set of the macro keys, and the corresponding macro definition data of the remaining part of the set of the macro definition data remain unchanged.

13. The macro function setting method of claim 12, wherein the step of changing the macro definition data of the first macro key according to the input code further comprises:

obtaining a first macro index corresponding to the first macro key from a first location in the memory unit; obtaining a second macro index according to the first macro index and the inputted code; and storing the second macro index in the first location, wherein the second macro index points to the second macro definition data.

14. The macro function setting method of claim 13, wherein the memory unit further comprises a first memory area and a second memory area, and each of the macro keys has a fixed corresponding location within the first memory area while the predefined macro definition data is stored within the second memory area.

15. The macro function setting method of claim 14, further comprising:

providing a display unit for displaying the setting result of the first macro key.

16. The macro function setting method of claim 12, wherein the keyboard further couples to an external data analysis device and the keyboard further returns the switching results of the macro keys to the external analysis device for confirmation.

17. A machine-readable storage medium comprising a computer program, which, when executed, causes a device to perform a macro function setting method for a keyboard with macro functions, wherein the keyboard at least comprises a switch key, a set of macro keys, and a memory unit, wherein the memory unit stores a set of predefined macro definition data and macro index and each of the macro keys separately corresponds to a macro definition data in a plurality of predefined macro definition data, and wherein the macro definition data represents a sequences of operations, and the method comprising: detecting that the switch key and a first macro key of the macro keys have been pressed, wherein the first macro key corresponds to a first macro definition data and corresponds to a macro index;

calculating the number of times that the first macro key has been pressed when the switch key has not been released; and when the switch key is released, changing the macro index of the first macro key according to the number of times that the first macro key has been pressed such that the first macro key corresponds to a second macro definition data.

\* \* \* \* \*